(12) United States Patent
Watanabe et al.

(10) Patent No.: US 11,537,354 B2
(45) Date of Patent: Dec. 27, 2022

(54) HEAD-UP DISPLAY SYSTEM

(71) Applicant: Maxell, Ltd., Kyoto (JP)

(72) Inventors: Toshimitsu Watanabe, Kyoto (JP); Nozomu Shimoda, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/275,359

(22) PCT Filed: Sep. 10, 2019

(86) PCT No.: PCT/JP2019/035473
§ 371 (c)(1),
(2) Date: Mar. 11, 2021

(87) PCT Pub. No.: WO2020/054694
PCT Pub. Date: Mar. 19, 2020

(65) Prior Publication Data
US 2022/0050654 A1   Feb. 17, 2022

(30) Foreign Application Priority Data

Sep. 13, 2018 (JP) .............................. JP2018-171348

(51) Int. Cl.
*G06F 3/14* (2006.01)
*B60K 35/00* (2006.01)
(Continued)

(52) U.S. Cl.
CPC ............ *G06F 3/1454* (2013.01); *B60K 35/00* (2013.01); *G02B 27/0101* (2013.01);
(Continued)

(58) Field of Classification Search
CPC ....... G06F 3/1454; G06F 3/167; B60K 35/00; B60K 2370/148; B60K 2370/1526;
(Continued)

(56) References Cited

U.S. PATENT DOCUMENTS

2002/0032048 A1   3/2002   Kitao et al.
2008/0165984 A1   7/2008   Yun et al.
(Continued)

FOREIGN PATENT DOCUMENTS

JP   2001309557 A   * 11/2001
JP   2002-125013 A    4/2002
(Continued)

OTHER PUBLICATIONS

International Search Report of PCT/JP2019/035473 dated Nov. 19, 2019.

*Primary Examiner* — Jennifer Mehmood
*Assistant Examiner* — Kim Thanh T Tran
(74) *Attorney, Agent, or Firm* — Mattingly & Malur, PC

(57) ABSTRACT

An HUB system 1 is equipped with an HUB device 10 for displaying a video in front of a vehicle; a communication unit 31 for connecting a mobile device 3 with the HUD device and establishing communication; a speaker 32 for outputting sounds to a driver; a microphone 33 for picking up the voices of the driver; a sound recognition unit 34 for analyzing the picked-up voices; and an in-vehicle camera 35 for photographing the face of the driver. When there is an incoming call at the mobile device, a calling indication of the mobile device 3 is displayed on the display screen of the HUD device, an incoming call sound is outputted from the speaker, and on the basis of a result of an analysis of voices uttered by the driver performed by the sound recognition unit, the conversation operations of the mobile device are started or ended.

8 Claims, 6 Drawing Sheets

(51) Int. Cl.
  *G02B 27/01* (2006.01)
  *G06F 3/16* (2006.01)
  *G09G 3/00* (2006.01)
  *G10L 15/22* (2006.01)

(52) U.S. Cl.
  CPC .............. *G06F 3/167* (2013.01); *G09G 3/001* (2013.01); *G10L 15/22* (2013.01); *B60K 2370/148* (2019.05); *B60K 2370/157* (2019.05); *B60K 2370/1526* (2019.05); *B60K 2370/21* (2019.05); *G02B 2027/014* (2013.01); *G02B 2027/0138* (2013.01); *G09G 2340/0464* (2013.01); *G09G 2354/00* (2013.01); *G09G 2380/10* (2013.01)

(58) Field of Classification Search
  CPC .......... B60K 2370/157; B60K 2370/21; B60K 2370/1464; B60K 2370/149; B60K 2370/1529; B60K 2370/563; B60K 2370/569; B60K 2370/577; B60K 37/06; G02B 27/0101; G02B 2027/0138; G02B 2027/014; G02B 27/01; G09G 3/001; G09G 2340/0464; G09G 2354/00; G09G 2380/10; G09G 5/14; G09G 2370/20; G09G 5/377; G09G 2370/16; G10L 15/22; H04M 1/6091; H04M 2250/74
  USPC ......................................................... 345/681
  See application file for complete search history.

(56) References Cited

U.S. PATENT DOCUMENTS

| 2011/0187547 A1* | 8/2011  | Kweon .................. B60K 35/00 340/670 |
| 2015/0116448 A1* | 4/2015  | Gottlieb ........... H04N 21/47205 348/14.03 |
| 2015/0316765 A1  | 11/2015 | Kim et al. |
| 2015/0358471 A1  | 12/2015 | Roth et al. |
| 2017/0197617 A1* | 7/2017  | Penilla .................... G08G 1/163 |
| 2018/0204573 A1* | 7/2018  | Iwasa ...................... G10L 15/30 |
| 2018/0308482 A1* | 10/2018 | Ro .......................... G06F 3/167 |

FOREIGN PATENT DOCUMENTS

| JP | 2002-193046 A | 7/2002 |
| JP | 2015-100069 A | 5/2015 |
| JP | 2016-509767 A | 3/2016 |

* cited by examiner

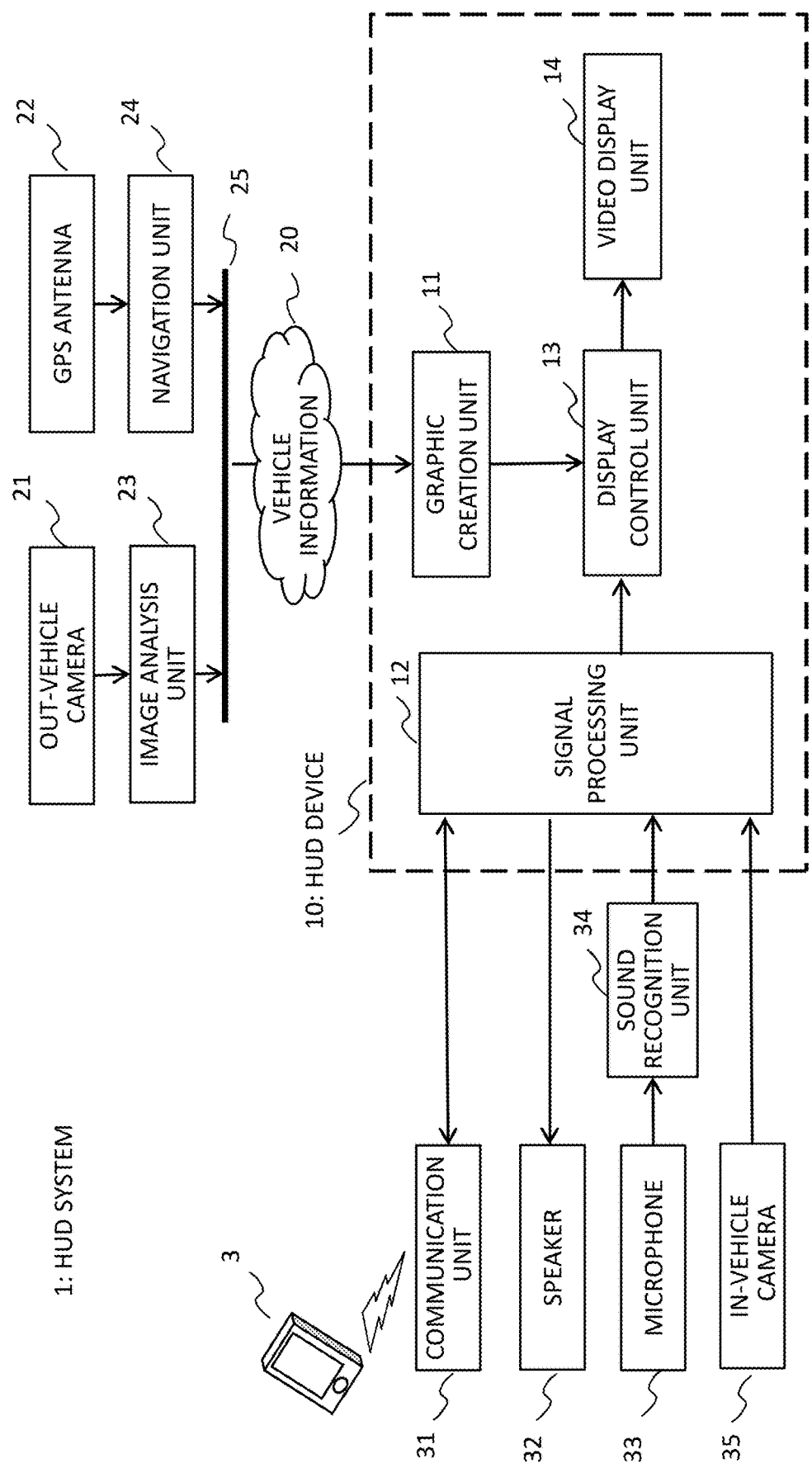

FIG. 4
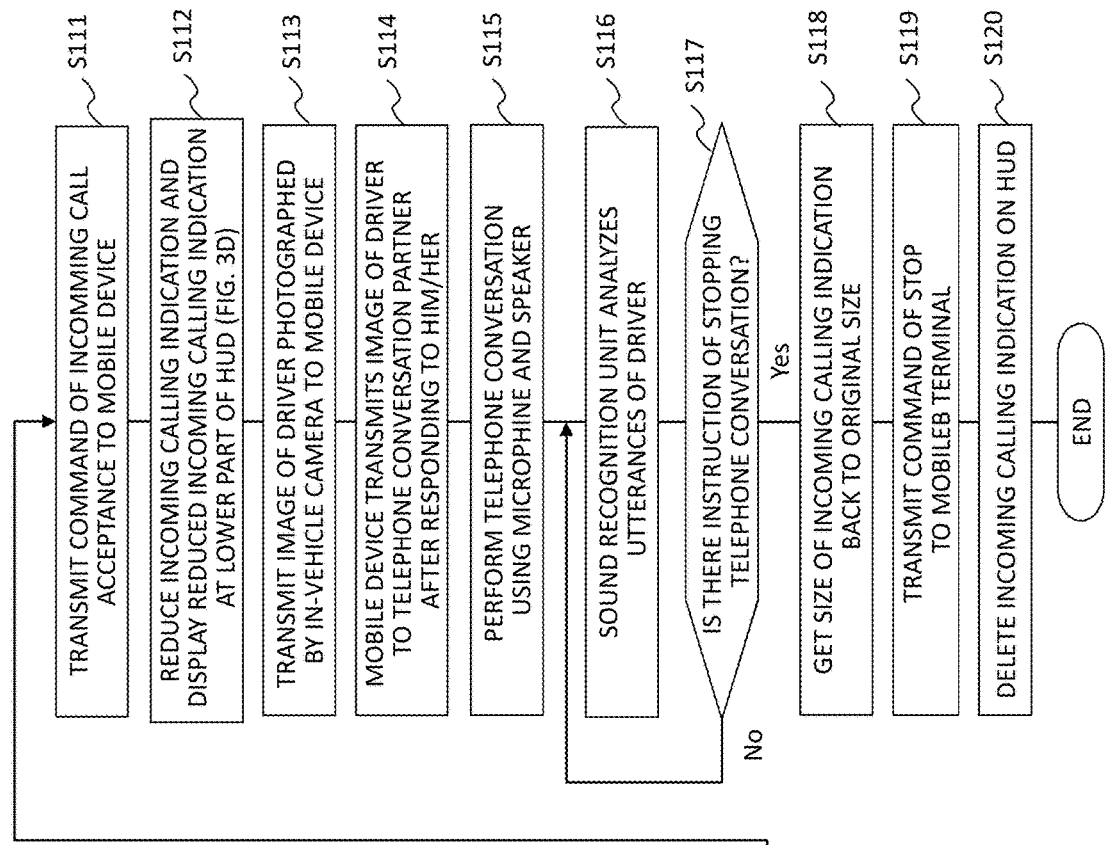
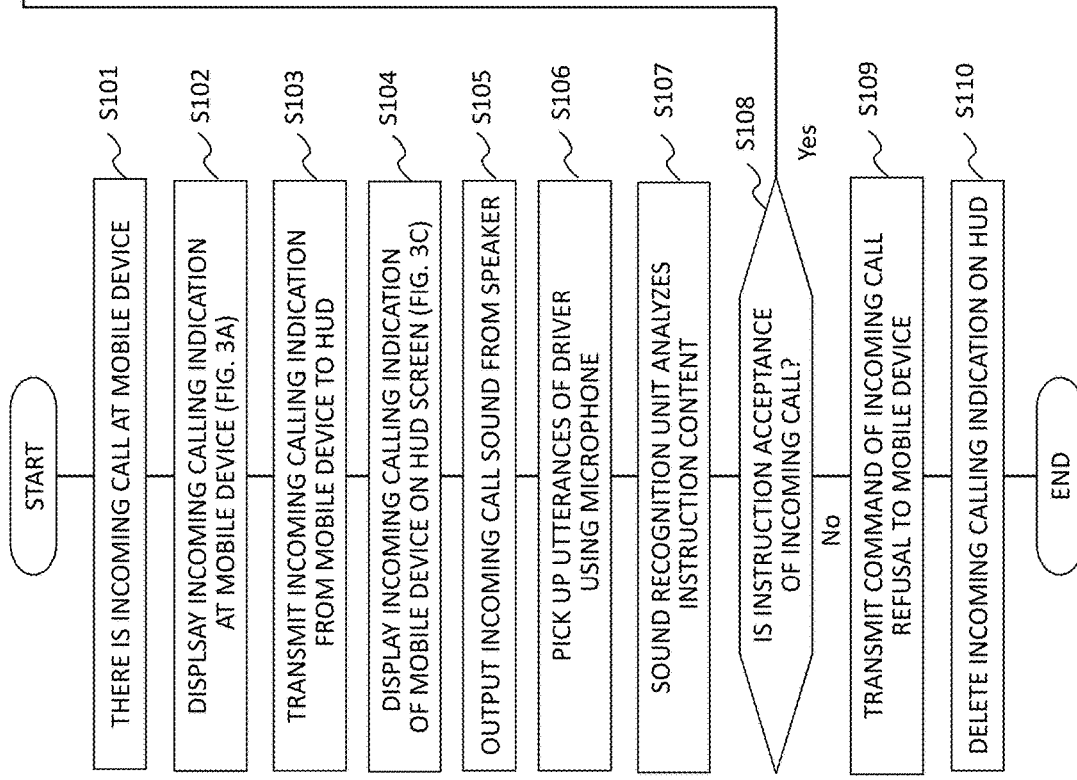

DISPLAY SOUND ICON ON HUD SCREEN

EXAMPLE OF SOUND ICON

HEAD-UP DISPLAY SYSTEM

TECHNICAL FIELD

The present invention relates to a head-up display system that, by using a head-up display device installed in a vehicle, displays images of the screen of a mobile device connected to the head-up display device and can communicate with a terminal of a partner.

BACKGROUND ART

In recent years, a head-up display device (referred to as an HUD device hereinafter) that is installed in a vehicle and displays video information in front via the window shield of the vehicle has been put into practical use. In this case, if driving support information for a driver of a vehicle is provided as displayed video information, it can greatly contribute to safe driving. On the other hand, in the case a driver of a vehicle uses a mobile device such as a smartphone brought into the vehicle, if the driver operates the mobile device while driving the vehicle, it may lead to a serious safety hazard, therefore it is indispensable to use the mobile device via hands-free equipment or the like to perform safe driving.

As an example in association with the above, PLT 1 discloses a configuration in which a mobile device such as a smartphone is used in connection with an in-vehicle device having a hands-free conversation function. In addition, the in-vehicle device disclosed in PLT 1 searches for mobile devices located in its wireless communicable area, and a user selects an MAC address corresponding to a displayed specific mobile device, so that connection between the mobile device and the in-vehicle device can be established.

CITATION LIST

Patent Literature

PLT 1: Japanese Patent Application Laid-Open No. 2015-100069

SUMMARY OF INVENTION

Technical Problem

In the case where a driver uses a mobile device such as a smartphone brought into a vehicle, the driver can have conversation with the terminal of a partner without the driver executing manual operations by using the mobile device via hands-free equipment or the like. However, existing hands-free equipment has the following problems regarding their usability.

If there is an incoming call at a mobile device installed in a moving vehicle, the relevant driver can notice an incoming call sound or the like but cannot immediately identify who a conversation partner is, which gives inconvenience to the driver. In other words, there is a fear of the safety of driving being sacrificed because the driver driving the vehicle transfers his/her gaze to the mobile device or hands-free equipment in order to know who the conversation partner is. Furthermore, if plural mobile devices or in-vehicle instruments that make sounds are connected, a driver cannot immediately judge which terminal (instrument) is making the sounds, which gives inconvenience to the driver. The above results in a fear of the driver failing to catch driving guidance information that should preferentially be caught by the driver.

An object of the present invention is to provide a head-up display system in which communication operations at a mobile device can easily be performed without sacrificing the safety of driving.

Solution to Problem

In order to solve the abovementioned problem, a head-up display system according to the present invention includes: a head-up display device (referred to as an HUD device hereinafter) installed in a vehicle for displaying a video in front of the vehicle viewed from a driver; a communication unit for connecting a mobile device with the HUD device and establishing communication; a speaker for outputting sounds to the driver; a microphone for picking up the voices of the driver; a sound recognition unit for analyzing the voices picked up by the microphone; and an in-vehicle camera for photographing the face of the driver. The HUD device includes: a signal processing unit that performs signal processing of sound signals and image signals that are propagated between the mobile device, the speaker, the microphone, and the in-vehicle camera; and a display control unit that controls the display of videos on the display screen of the HUD device, and the driver can perform conversation operations via the mobile device by using the speaker and the microphone. A calling indication of the mobile device is displayed on the display screen of the HUD device, and at the same time, an incoming call sound is outputted from the speaker when there is an incoming call at the mobile device, and on the basis of a result of an analysis of voices uttered by the driver performed by the sound recognition unit, the conversation operations of the mobile device are started or ended.

Advantageous Effects of Invention

According to the present invention, a driver can easily perform communication operations at a mobile device brought into a vehicle without sacrificing the safety of driving by displaying the screen of the mobile device on the screen of an HUD device.

BRIEF DESCRIPTION OF DRAWINGS

FIG. 2 is a block diagram showing the entire configuration of the HUB system.

FIG. 4 is a flowchart showing the conversation processing of the mobile device performed in the HUD system.

DESCRIPTION OF EMBODIMENTS

An embodiment of a head-up display system (referred to as an HUD system hereinafter) according to the present invention will be explained with reference to the accompanying drawings.

Figure 1:
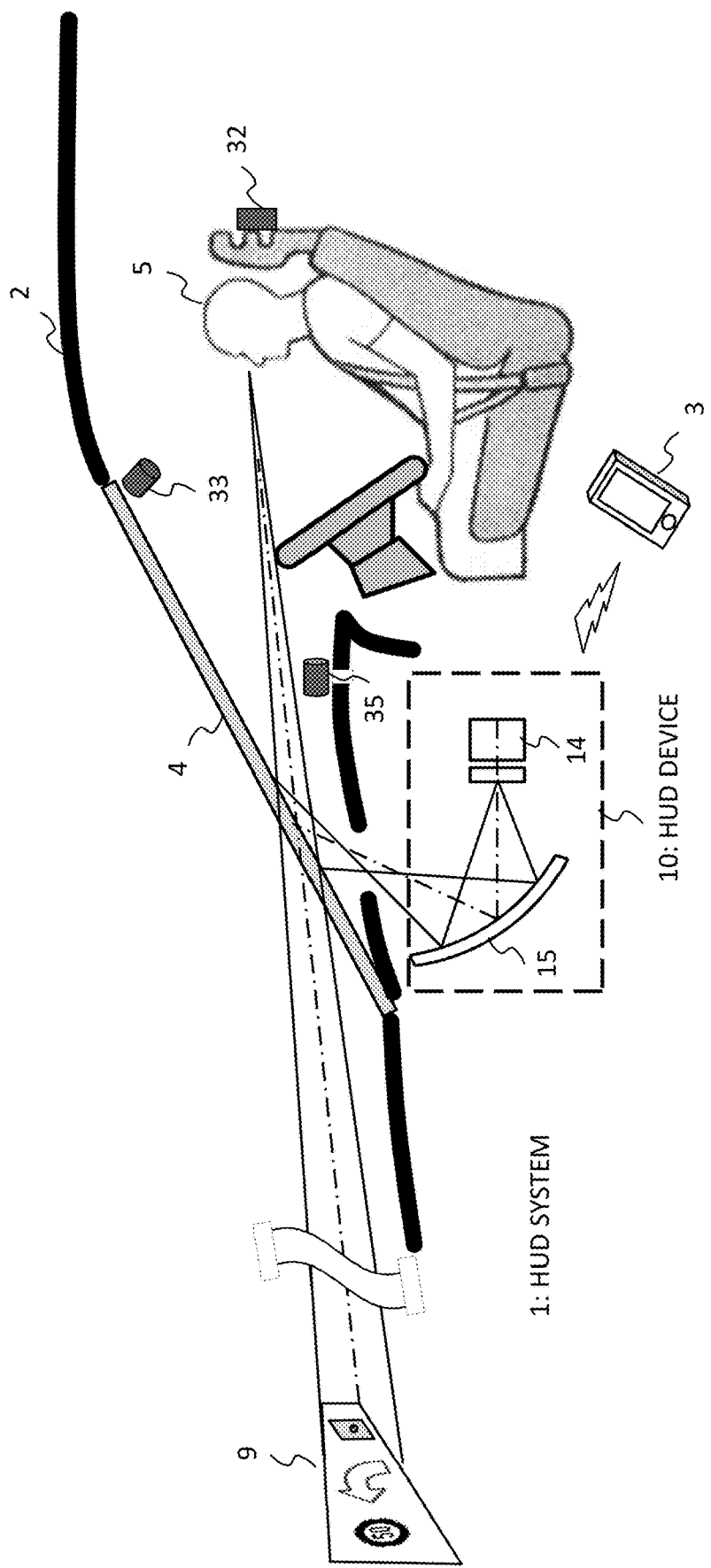
FIG. 1 is a diagram for explaining the outline of an HUB system installed in a vehicle.

FIG. 1 is a diagram for explaining the outline of the HUB system installed in a vehicle. The HUD system 1 projects a video to be displayed from a head-up display device (an HUD device) 10 installed at the lower portion of the dashboard of the vehicle 2. The HUD device 10 includes a video display unit 14 for creating and projecting a video and a concave mirror 15 for reflecting the projected video to a window shield 4. The video reflected at the window shield 4 goes into the eyes of a driver 5 and can be recognized visually. In this case, the fact is that the driver 5 looks at a virtual image 9 existing in front of the window shield 4. Hereinafter, this virtual image 9 will also be referred to as a HUD screen. In the HUD screen (virtual image) 9, driving information and vehicle information are displayed on the foreground of the vehicle in a superimposed manner, which supports the driving operations of the driver.

In addition, the HUD system 1 of this embodiment is configured in such a way that the communication operations of a mobile device 3 brought into the vehicle such as a smartphone, a tablet terminal, a notebook-sized personal computer, or the like are hands-freely performed using the video display function of the HUB device 10. In other words, after the communication connection between the mobile device 3 and the HUD device 10 are established, the communication operations (such as incoming calls, sound conversations, and image transmissions and receptions) at the mobile device 3 are performed via the HUD screen 9 and a speaker 32, a microphone 33, an in-vehicle camera 35 that are installed in the vehicle. As for installation locations for the above devices, it is preferable, for example, that the speaker 32 is installed on the head rest of the driver's seat, the microphone 33 is installed at the upper portion of the window shield 4, and the in-vehicle camera 35 is installed on the dashboard, but it is also possible that these installation locations are changed accordingly by the driver.

In this case, the screen of an incoming call and a received image of the mobile device 3 are displayed in a superimposed manner on the display of driving support information in the HUD screen 9, or the screen of the incoming call and the received image are displayed in place of a part of the screen. With this, the driver 5 can not only perform the communication operations at the mobile device 3 hands-freely, but also can look at the HUD screen 9 displaying videos always within the driver's field of view. In other words, because the driver 5 does not transfer his/her gaze to the mobile device 3 or other instruments for communication operations at the mobile device 3, there is no fear of the safety of driving being sacrificed.

FIG. 2 is a block diagram showing the entire configuration of the HUB system. The HUD system 1 is configured in such a way that several external instruments and devices are connected to the HUD device 10 that projects and displays videos.

First, a configuration associated with driving support operations based on the vehicle information will be explained. An out-vehicle camera (an out-vehicle monitoring camera) 21 and a GPS (Global Positioning System) antenna 22 are connected as external instruments for obtaining the vehicle information 20.

The out-vehicle camera 21 photographs the states of the surroundings-such as the front and the rear-of the vehicle 2, and an image analysis unit 23 analyzes the obtained images, so that, for example, the presence or absence of other vehicles and pedestrians around the vehicle 2, road traffic signs, and road-surface conditions are obtained.

The GPS antenna 22 receives GPS signals, so that the current position information of the vehicle 2 is obtained. In a navigation unit 24, by comparing the position information with map data, map information showing the current position and the moving directions (the right direction, the left direction, the straight-ahead direction, and the like) of the vehicle 2 is created, and furthermore sound guidance information for the driver is created if necessary.

Furthermore, the vehicle information 20 including the speed of the vehicle, gear information, a wheel steering angle, ACC (Adaptive Cruise Control), a travel lane, and the like that are output from a not-shown in-vehicle electronic control unit (ECU) is inputted via an in-vehicle bus 25 as a signal compliant with the CAN (Controller Area Network) standard.

A graphic image creation unit 11 in the HUD device 10 creates individual graphic images on the basis of these pieces of the vehicle information 20, and these graphic images are displayed from a video display unit 14. In addition, the sound guidance information is outputted from a not-shown speaker. A display control unit 13 performs the control of the display positions of the graphic images created by the graphic image creation unit 11, the sizes of the displays, the synthesis of plural images, and the like.

Next, a configuration associated with a communication function between the HUD device 10 and the mobile device 3 brought into the vehicle will be explained. A communication unit 31, the speaker 32, the microphone 33, and the in-vehicle camera 35 are provided as external instruments for providing the communication function between the HUD device 10 and the mobile device 3. In other words, these external instruments play roles of devices that are substituted for the conversation function and the image transmission/reception function of the mobile device 3 in order that the driver may hands-freely use the mobile device 3.

The communication unit 31 is a device wirelessly connected to the mobile device 3 and uses a communication module such as a Bluetooth (registered mark) module or a Wi-Fi (registered trademark) module for example. In this case, the communication unit 31 includes a function (the HFP Profile) that enables a conversation (transmission/reception) function between a partner terminal of the mobile device 3 and the communication unit itself and a function (the BIP Profile) that performs image propagation and camera control. As means other than the wireless communication, a USB (registered trademark) cable can be used for the above connection.

The speaker 23 is a device that outputs an incoming call sound (an incoming call message) at the mobile device 3 and the voices of a conversing partner. Here, if the HUD device 10 includes a speaker that outputs the sound guidance information from the navigation unit 24, it is conceivable that the functions of the two are provided by a common speaker.

The microphone 33 not only picks up the voices of the driver who has conversation with the partner using the mobile device 3, but also picks up the voices of the driver when operation instructions to the mobile device 3 are issued by the voices (utterances) of the driver. Therefore, the sound recognition unit 34 judges what kind of operation instruction is issued by analyzing the voices of the driver.

The in-vehicle camera 35 is one of devices composing a driver monitoring system (DMS) and transmits the face of the driver to the conversation partner of the mobile device 3 after photographing the face of the driver.

The external instruments such as the communication unit 31, the speaker 32, the microphone 33 (sound recognition unit 34), and the in-vehicle camera 35 are connected to a signal processing unit 12 of the HUD device 10. The signal processing unit 12 performs signal processing of sound signals and image signals propagated between the mobile devices 3 and the individual external instruments such as the speaker 32. Furthermore, when the mobile device 3 receives an incoming call or images, the signal processing unit 12 transfers those pieces of reception information to the display control unit 13. The display control unit 13 displays communication information regarding the mobile device 3 transmitted from the signal processing unit 12 as well as driving support information transmitted from the graphic image creation unit 11 on the HUD screen 9 via the video display unit 14. With this, the driver can safely perform fundamental operations such as the conversation function and image transmission/reception function of the mobile device 3 via the HUD screen 9, the speaker 32, the microphone 33, the in-vehicle camera 35, and the like in a hands-free manner.

Next, the communication/display function of the HUD system 1 according to the present invention will be concretely explained for each of some examples.

Example 1

In Example 1, a case where the conversation function of the mobile device 3 is put into practice in the HUD system 1 will be explained. At the time of the ignition switch of the vehicle 3 being turned on, the mobile device 3 and the HUD device 10 are connected to (paired with) each other via the communication unit 31 compliant with, for example, the Bluetooth (registered trademark) standard. Successively, when there is an incoming call at the mobile device 3, the screen of the mobile device 3 is displayed on the HUD screen 9 that is recognized visually by the driver. Examples of the display screen will be shown in the following.

Figure 3A:
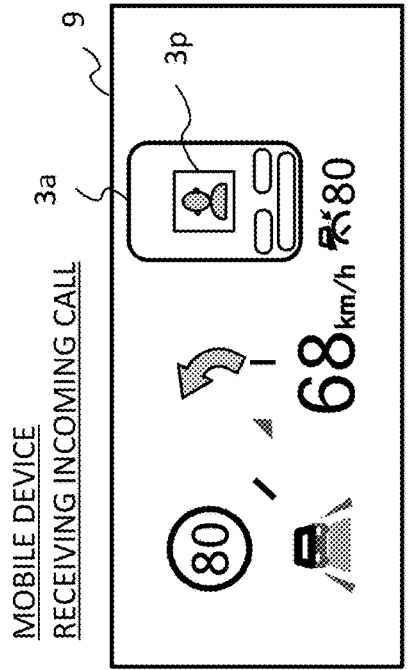
FIG. 3A is a diagram showing a display example of the screen of a mobile device at the time of the mobile device receiving an incoming call.

FIG. 3A shows a display example of the screen of the mobile device 3 at the time of receiving an incoming call. The mobile device 3 is set in an incoming call mode, and the face image 3p of a conversation partner is displayed on the screen of the mobile device 3 (only in the case where of having been registered in advance).

Figure 3C:
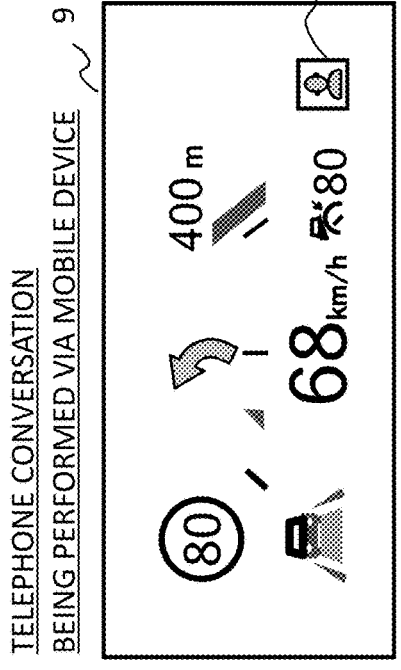
FIG. 3C is a diagram showing a display example of the HUD screen in a state of the mobile device receiving an incoming call.
Figure 3B:
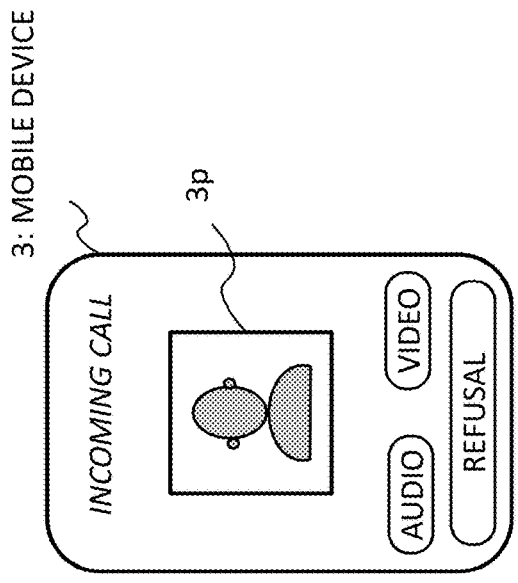
FIG. 3B is a diagram showing a display example of an HUD screen in a state of the mobile device before receiving an incoming call.

FIG. 3B shows a display example of the HUD screen 9 in a state of the mobile device 3 before receiving an incoming call. Driving support information including the current speed and travel lane of the vehicle, road traffic signs, and the like are displayed on the HUD screen 9 by graphic images 20a.

FIG. 3C shows a display example of the HUD screen 9 in a state of the mobile device 3 receiving an incoming call. If there is an incoming call at the mobile device 3, the screen of the mobile device 3 is transferred to the HUD device 10 using the BIP Profile. Successively, the screen of the mobile device 3 is displayed on the HUD screen 9 by the video display unit 14 via the signal processing unit 12 and the display control unit 13. At this time, the indication 3a of the mobile device 3 is superimposedly displayed on a part of the area of the graphic images (driving support information) 20a created by the graphic image creation unit 11. In addition, the face image 3p of the conversation partner of the mobile device 3 is also displayed on the HUD screen 9. Therefore, the driver can visually recognize immediately not only the arrival of the incoming call at the mobile device 3 but also who the conversation partner is. At the same time, because an incoming call sound or the sound of an incoming call message is outputted from the speaker 32 via the signal processing unit 12, the driver can know the occurrence of the incoming call without fail.

If the driver utters a term to the effect that he/she accepts the incoming call (for example, "yes") in response to the incoming call, it becomes possible for the driver to have conversation with the partner. In contrast with this, if the driver utters a term to the effect that he/she refuses the incoming call (for example, "no"), a conversation connection to the partner is cut off. In the above cases, the utterances of the driver are picked up by the microphone 33, and the sound recognition unit 34 compares the utterances with terms ("yes", "no", and the like), which have been registered in advance, to judge the instruction content (the acceptance, refusal, or the like) of the driver.

Figure 3D:
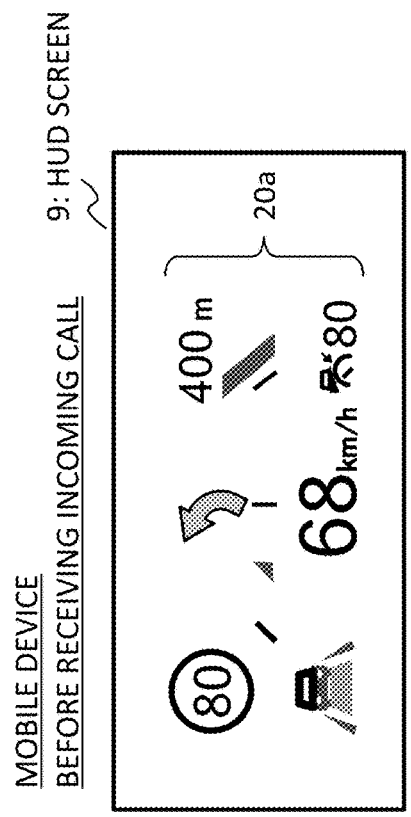
FIG. 3D is a diagram showing a display example of the HUD screen in a state of conversation being performed via the mobile device.

FIG. 3D is a diagram showing a display example of the HUD screen 9 in a state of conversation being performed via the mobile device 3. During the conversation, the indication 3a of the mobile device in the HUD screen 9 is changed into an icon 3b of a small area, moved to the lower part of the HUD screen 9 and displayed. The screen 3b is displayed on the HUD screen as above to conform to the regulation of an image display area rate in the HUD screen set for safe driving of drivers. Because there is a regulation to the effect that the display area rate of images (contents) displayed in the HUD screen should be 35% or less in automobile-related specifications, the above display of the icon 3b is performed in order to satisfy this regulation. Therefore, if the display area rate becomes larger than 35% in FIG. 3C, it is necessary for the indication 3a of the mobile device to be displayed as an icon of a small area as shown in FIG. 3D. Alternatively, it is conceivable that some of pieces of the vehicle information 20 (for example, road traffic signs and the like) are deleted.

On the other hand, the image of the driver photographed by the in-vehicle camera 35 are propagated to the mobile device 3, and the mobile device 3 responds to the conversation partner and transmits the image to the conversation partner.

In the case where the driver utters a term to the effect that he/she finishes the conversation (for example, "off" or "finish") when the conversation is finished, the iconized screen 3b of the mobile device once goes back to the indication 3a of the original size shown in FIG. 3C, and is deleted after a predefined time. Subsequently, the conversation operation between the mobile device and the conversation partner is finished.

FIG. 4 is a flowchart showing the conversation processing of the mobile device performed in the HUD system 1. The following processes are controlled mainly by the signal processing unit 12. At the time when the ignition key of the vehicle is turned on, the HUD device 10 and the mobile device 3 is connected to each other via the communication unit 31.

When there is an incoming call at the mobile device 3 (at S101), a calling indication is displayed at the mobile device 3 as shown in FIG. 3A (at S102).

The incoming screen of the mobile device 3 is transmitted to the HUD device 10 (at S103), and the calling indication 3a is displayed on the HUD screen 9 as shown in FIG. 3C (at S104). At the same time, an incoming call sound (or the sound of an incoming call message) is outputted from the speaker 32 (at S105).

A driver, who notices the incoming call, gives instructions by uttering voices. The microphone 33 picks up the response of the driver (at S106), and the instruction content of the driver is analyzed by the sound recognition unit 34 (S107). Whether or not the instruction content of the driver is acceptance of the incoming call is judged (at S108). Here, whether or not the instruction content of the driver is acceptance of the incoming call is judged by comparing the instruction content of the driver with the registered terms of the utterances recorded in advance.

If the instruction content of the driver is not acceptance of the incoming call (No at S108), a command of incoming call refusal is transmitted to the mobile device 3 (at S109). Subsequently, the calling indication 3a of the mobile device displayed on the HUD screen 9 is deleted (at S110), and the above processing is finished.

If the instruction content of the driver is acceptance of the incoming call (Yes at S108), a command of incoming call acceptance is transmitted to the mobile device 3 (at S111). Subsequently, as shown by the HUD screen 9 in FIG. 3D, the calling indication is moved to the lower part of the HUD screen 9 and displayed as an icon 3b obtained by reducing the size of the incoming screen (at S112).

On the other hand, the image of the driver is photographed by the in-vehicle camera 35, the photographed image is transmitted to the mobile device 3 (at S113), and the mobile device 3 transmits the image of the driver to a conversation partner after responding to the conversation partner (at S114). The driver starts a conversation operation via the mobile device 3 using the microphone 33 and the speaker 32 (at S115).

During the conversation, the sound recognition unit 34 analyzes the response of the driver (at S116) and judges whether or not the instruction of stopping the conversation (for example, the voice of "off") is issued (at S117).

If there is the instruction of stopping the conversation (Yes at S117), the size of the calling indication on the HUD screen 9 is brought back to the original size (at S118), and a command of stop is transmitted to the mobile device 3 (at A119). Subsequently, the calling indication on the HUD screen 9 is deleted (at S120), and the above processing is finished.

As explained above, the conversation function of the mobile device 3 can safely be carried out in a hands-free manner in the HUD system 1 according to Example 1. In this case, because the face image 3p of the conversation partner of the mobile device 3 is displayed on the HUD screen 9, the driver can immediately and visually recognize who the conversation partner is. Furthermore, the sound recognition unit 34 analyzes the voices of the driver and judges what kind of operation instruction is issued by the driver, so that the usability of the HUD system 1 can be improved.

Example 2

In Example 2, an image reception function will be explained. For example, the image reception function is, for example, a function for displaying images posted via an SNS (Social Networking Service) and the like on the HUB screen 9 while a vehicle is moving along a road that is congested with traffic or near to an accident site. Although this function is a function to be added to the conversation function of Example 1, this function can also be put into practice as an independent function.

Figure 5B:
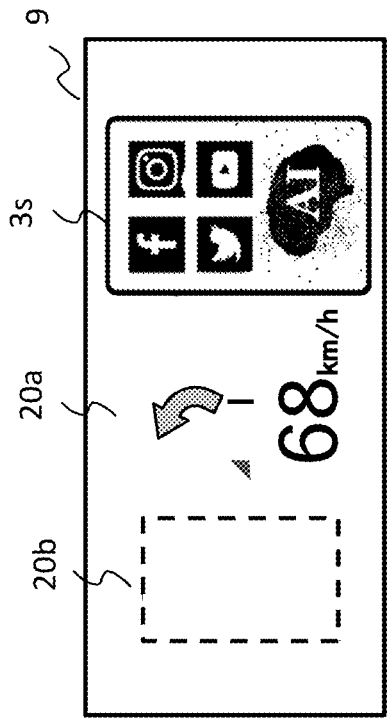
FIG. 5B is a diagram showing a state where an SNS picture image of the mobile device is displayed on the HUD screen.
Figure 5A:
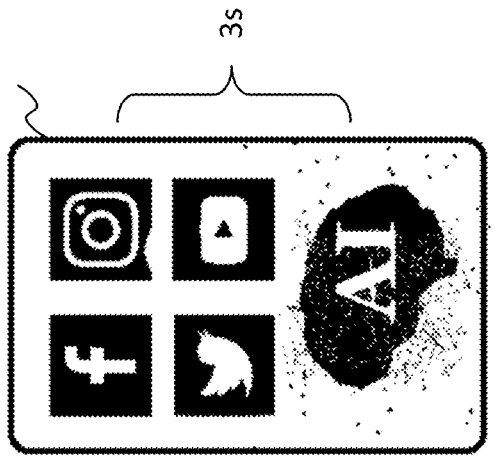
FIG. 5A is a diagram showing a display example of SNS information on the screen of the mobile device.

FIG. 5A is a diagram showing a display example of SNS information on the screen of the mobile device 3. For example, if there is an accident site or the like on the driving route of a vehicle, the mobile device 3 can receive an SNS image or the congestion state of the relevant road that is posted from an external terminal and can display it on the screen of its own. In this example, an SNS picture image (including various logos) 3s is displayed.

FIG. 5B is a display example of the HUD screen 9 and shows a state of the HUD screen 9 on which an SNS picture image 3s of the mobile device is displayed. The SNS picture image 3s of the mobile device 3 is transferred to the HUD device 10, and the SNS picture image 3s is superimposedly displayed on a part of the area for the driving support information 20a on the HUD screen 9. However, also in this case, some contents with lower priorities among contents included in the driving support information 20a are deleted or iconized to be contractively displayed so that an image display area rate in the HUD screen 9 becomes the regulated value or less. In this example, a road traffic sign (speed limit 80 km), which was displayed within a dashed line frame 20b, is deleted.

After checking the SNS picture image on the HUD screen, the driver issues an instruction using voices. If the driver utters a term "delete" or the like, the display of the SNS picture image is judged to be unnecessary via the microphone 33 and the sound recognition unit 34, and the SNS picture image 3s is deleted. If the driver utters a term "next" or the like, a similar SNS-posted image is displayed instead of the SNS picture image 3s. If the driver utters a term "finish" or the like, the display of SNS-posted images is finished.

According to Example 2, while a vehicle is moving along a road that is congested with traffic or near to an accident site, SNS-posted images regarding this situation and the like are displayed on the HUD screen 9, therefore a driver can effectively obtain useful information regarding the driving route of the vehicle in a hands-free manner.

Here, the abovementioned terms ("yes", "no", "delete", and the like) uttered by the driver in order to give communication instructions to the mobile device are only examples, and it goes without saying that a user can arbitrarily set and register these terms.

Example 3

In Example 3, a method for identifying which mobile device is outputting sounds will be explained in the case where plural mobile devices 3 are connected to the HUD device 10, or a method for identifying which of an instrument connected to the HUD device 10 (for example, the navigation unit 24) and a mobile device 3 brought into the vehicle is outputting sounds will be explained. Not only in the case where a speaker is used in common by the plural mobile devices but also in the case where each of plural mobile devices is provided with a speaker, the usability of the HUD system is improved by identifying which terminal is outputting sounds. This function is used in such a manner to be added to the conversation function of Example 1.

Figure 6B:
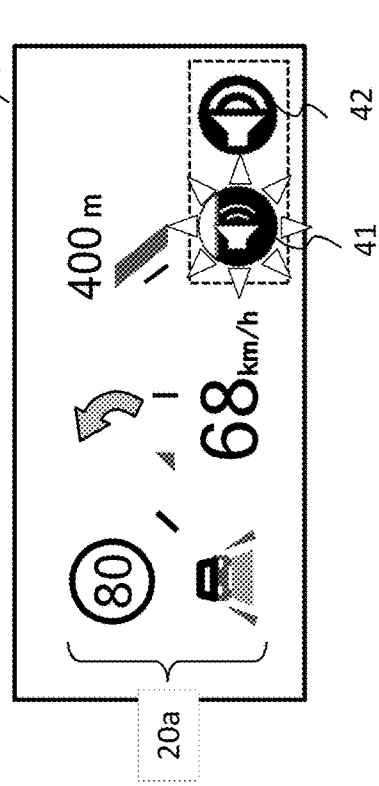
FIG. 6B is a diagram showing a state of the HUD screen on which plural sound icons are displayed.
Figure 6A:
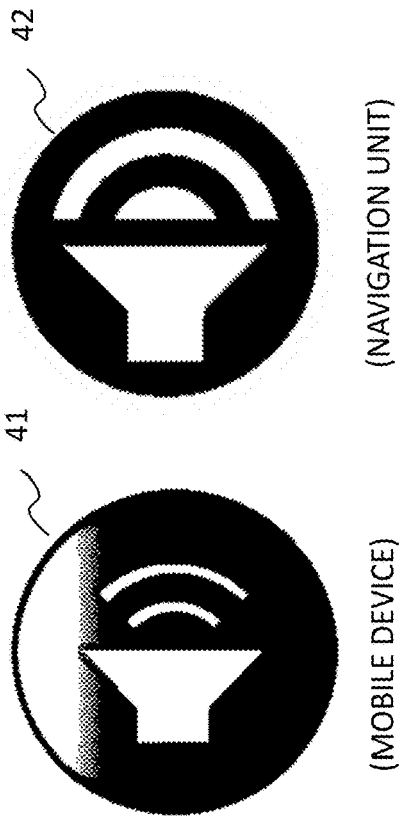
FIG. 6A is a diagram showing examples of icons for distinguishing among plural speakers.

FIG. 6A is a diagram showing examples of sound icons for distinguishing among plural speakers (or plural sound sources). For example, in the case where one mobile device 3 and the navigation unit 24 are connected, a reference sign 41 shows a sound icon representing the speaker of the mobile device 3 and a reference sign 42 shows a sound icon representing the speaker of the navigation unit 24. Both of the sound icons have shapes different from each other, and on top of that, it is possible to easily distinguish between the both sound icons by making the colors of the both sound icons different from each other.

FIG. 6B is a display example of the HUD screen 9 showing a state where plural sound icons are displayed. In the HUD screen, the sound icons 41 and 42 of the plural speakers shown in FIG. 6A as well as the driving support information 20a are displayed in parallel.

When the mobile device 3 or the navigation unit 24 utters sounds while the vehicle is moving, the display control unit 13 of the HUD device 10 judges from which of the terminals the sounds are outputted. Subsequently, the sound icon of the appropriate speaker is blinked or highlighted. In this example, the left sound icon 41 is blinked, which shows that the mobile device 3 is uttering the sounds. With this, the driver can easily judge which terminal is outputting the sounds.

According to Example 3, a terminal that is uttering sounds can easily be identified, which contributes to the safety of driving. For example, in the case where the driving guidance information of the navigation unit 24 is more important than the sounds of the mobile device 3 from the standpoint of the safety of driving, the driver listens to the driving guidance information more carefully, so that there is little fear of the driver failing to catch the driving guidance information.

As described above, according to each of the Examples, the driver can easily perform the communication operations of the mobile device without sacrificing the safety of driving by displaying the screen of the mobile device brought into the vehicle on the HUD device screen.

REFERENCE SIGNS LIST

1 . . . head-up display system (HUD system),
2 . . . vehicle,
3 . . . mobile device,
3b . . . icon of the mobile device,
3s . . . SNS picture image,
4 . . . window shield,
5 . . . driver,
9 . . . HUD screen (virtual image),
10 . . . head-up display device (HUD device),
11 . . . graphic image creation unit,
12 . . . signal processing unit,
13 . . . display control unit,
14 . . . video display unit,
20 . . . vehicle information,
20a . . . graphic images (driving support information),
31 . . . communication unit,
32 . . . speaker,
33 . . . microphone,
34 . . . sound recognition unit,
35 . . . in-vehicle camera,
41, 42 . . . sound icon.

The invention claimed is:

1. A head-up display system performing communication in connection with a mobile device, comprising:
a head-up display installed in a vehicle for displaying a video in front of the vehicle viewed from a driver;
a communication unit for connecting the mobile device with the HUD device and establishing communication;
a speaker for outputting sounds to the driver;
a microphone for picking up voices of the driver;
a sound recognition unit for analyzing the voices picked up by the microphone; and
an in-vehicle camera for photographing a face of the driver,
wherein the HUD device includes:
a signal processing unit that performs signal processing of sound signals and image signals that are propagated between the mobile device, the speaker, the microphone, and the in-vehicle camera; and
a display control unit that controls the display of videos on the display screen of the HUD device,
wherein conversation operations are performed with the driver via the mobile device by using the speaker and the microphone,
wherein a calling indication of the mobile device is displayed on the display screen of the HUD device, and at the same time, an incoming call sound is output from the speaker when there is an incoming call at the mobile device,
wherein on the basis of a result of an analysis of voices uttered by the driver performed by the sound recognition unit, the conversation operations of the mobile device are started or ended, and
wherein the display control unit displays an incoming call screen of the mobile device on the display screen of the HUD device when there is an incoming call to the mobile device, and, when the conversation operation is started, the incoming call screen of the mobile device displayed on the display screen of the HUD device is changed to a small area icon and moves to the lower part of the display screen of the HUD device and display.

2. The head-up display system according to claim 1, wherein the sound recognition unit registers terms for indicating the start and the end of the conversation operation of the mobile device in advance and judges instruction contents of the driver by comparing the voices uttered by the driver with the registered terms.

3. The head-up display system according to claim 1, wherein the signal processing unit transmits a face image of the driver photographed by the in-vehicle camera to a conversation partner via the mobile device when the conversation operation of the mobile device is started.

4. A head-up display (HUD) system performing communication in connection with a mobile device, comprising:
a head-up display device installed in a vehicle for displaying a video in front of the vehicle viewed from a driver;
a communication unit for connecting the mobile device with the HUD device and establishing communication;
a speaker for outputting sounds to the driver;
a microphone for picking up voices of the driver;
a sound recognition unit for analyzing the voices picked up by the microphone; and
an in-vehicle camera for photographing a face of the driver,
wherein the HUD device includes:
a signal processing unit that performs signal processing of sound signals and image signals that are propagated between the mobile device, the speaker, the microphone, and the in-vehicle camera; and
a display control unit that controls the display of videos on the display screen of the HUD device,
wherein conversation operations are performed by the driver via the mobile device by using the speaker and the microphone, wherein a calling indication of the mobile device is displayed on the display screen of the HUD device, and at the same time, an incoming call sound is output from the speaker when there is an incoming call at the mobile device, wherein on the basis of a result of an analysis of voices uttered by the driver performed by the sound recognition unit, the conversation operations of the mobile device are started or ended, and wherein, if the signal processing unit receives an image posted to the mobile device by an external terminal while the vehicle is moving along a road that is congested with traffic or near to an accident site, the display control unit displays the received image in a superimposed manner onto the display screen of the HUD device, and at the same time, the display control unit deletes other display images so that an image display area rate in the display area becomes a regulated value or less and preferentially displays the received image.

5. The head-up display system according to claim 1,
wherein, in a case where a plurality of mobile devices are connected to the HUD device or in a case where the HUD device includes other speakers, the display control unit displays a plurality of sound icons on the display screen of the HUD device and displays a sound icon corresponding to a mobile device outputting sounds by blinking the sound icon.

6. The head-up display system according to claim 4,
wherein the sound recognition unit registers terms for indicating the start and the end of the conversation operation of the mobile device in advance and judges instruction contents of the driver by comparing the voices uttered by the driver with the registered terms.

7. The head-up display system according to claim 4,
wherein the signal processing unit transmits a face image of the driver photographed by the in-vehicle camera to a conversation partner via the mobile device when the conversation operation of the mobile device is started.

8. The head-up display system according to claim 4,
wherein, in a case where a plurality of mobile devices are connected to the HUD device or in a case where the HUD device includes other speakers, the display control unit displays a plurality of sound icons on the display screen of the HUD device and displays a sound icon corresponding to a mobile device outputting sounds by blinking the sound icon.

* * * * *